(12) United States Patent
Schoellhorn et al.

(10) Patent No.: US 6,607,009 B2
(45) Date of Patent: Aug. 19, 2003

(54) SEWAGE SYSTEM FOR VEHICLES

(75) Inventors: Robert A. Schoellhorn, Coburg, OR (US); Mark A Bryan, Eugene, OR (US); Alan B. Christianson, Eugene, OR (US); Gerald R. Lacey, Springfield, OR (US)

(73) Assignee: Marathon Coach, Inc., Coburg, OR (US)

( * ) Notice: Subject to any disclaimer, the term of this patent is extended or adjusted under 35 U.S.C. 154(b) by 64 days.

(21) Appl. No.: 09/881,293

(22) Filed: Jun. 13, 2001

(65) Prior Publication Data

US 2002/0189673 A1 Dec. 19, 2002

(51) Int. Cl.[7] .............................. F15B 9/00; F03C 1/12; F16K 27/12; F16L 3/00

(52) U.S. Cl. ............. 137/899; 137/355.12; 137/355.16; 4/323; 92/34

(58) Field of Search .......................... 137/899, 355.12, 137/355.16; 138/109, 121, 118.1; 4/323, 661; 92/34

(56) References Cited

U.S. PATENT DOCUMENTS

| | | | | | |
|---|---|---|---|---|---|
| 2,514,059 | A | * | 7/1950 | Hicks et al. | 92/34 |
| 3,811,462 | A | * | 5/1974 | Feliz | 137/240 |
| 4,133,347 | A | | 1/1979 | Mercer | |
| 4,223,702 | A | | 9/1980 | Cook | |
| 4,779,650 | A | | 10/1988 | Sargent et al. | |
| 4,854,349 | A | | 8/1989 | Foreman | |
| 5,023,959 | A | * | 6/1991 | Mercer | 4/321 |
| 5,078,180 | A | * | 1/1992 | Collins | 137/899 |
| 5,244,003 | A | | 9/1993 | Boomgaarden | |
| 5,247,974 | A | | 9/1993 | Sargent et al. | |
| 5,636,648 | A | | 6/1997 | O'Brien | |
| 5,653,262 | A | | 8/1997 | Hanemaayer | |
| 5,697,285 | A | * | 12/1997 | Nappi et al. | 91/519 |
| 5,816,639 | A | | 10/1998 | DiBiagio et al. | |
| 5,823,869 | A | | 10/1998 | Paturzo | |
| 5,904,183 | A | | 5/1999 | Leech | |
| 5,951,082 | A | | 9/1999 | DiBiagio et al. | |
| 5,988,221 | A | * | 11/1999 | Walker | 137/899 |

* cited by examiner

Primary Examiner—A. Michael Chambers
(74) Attorney, Agent, or Firm—Chernoff Vilhauer McClung & Stenzel, LLP

(57) ABSTRACT

A sewage system for vehicles that includes a waste hose that is extendable and retractable.

30 Claims, 2 Drawing Sheets

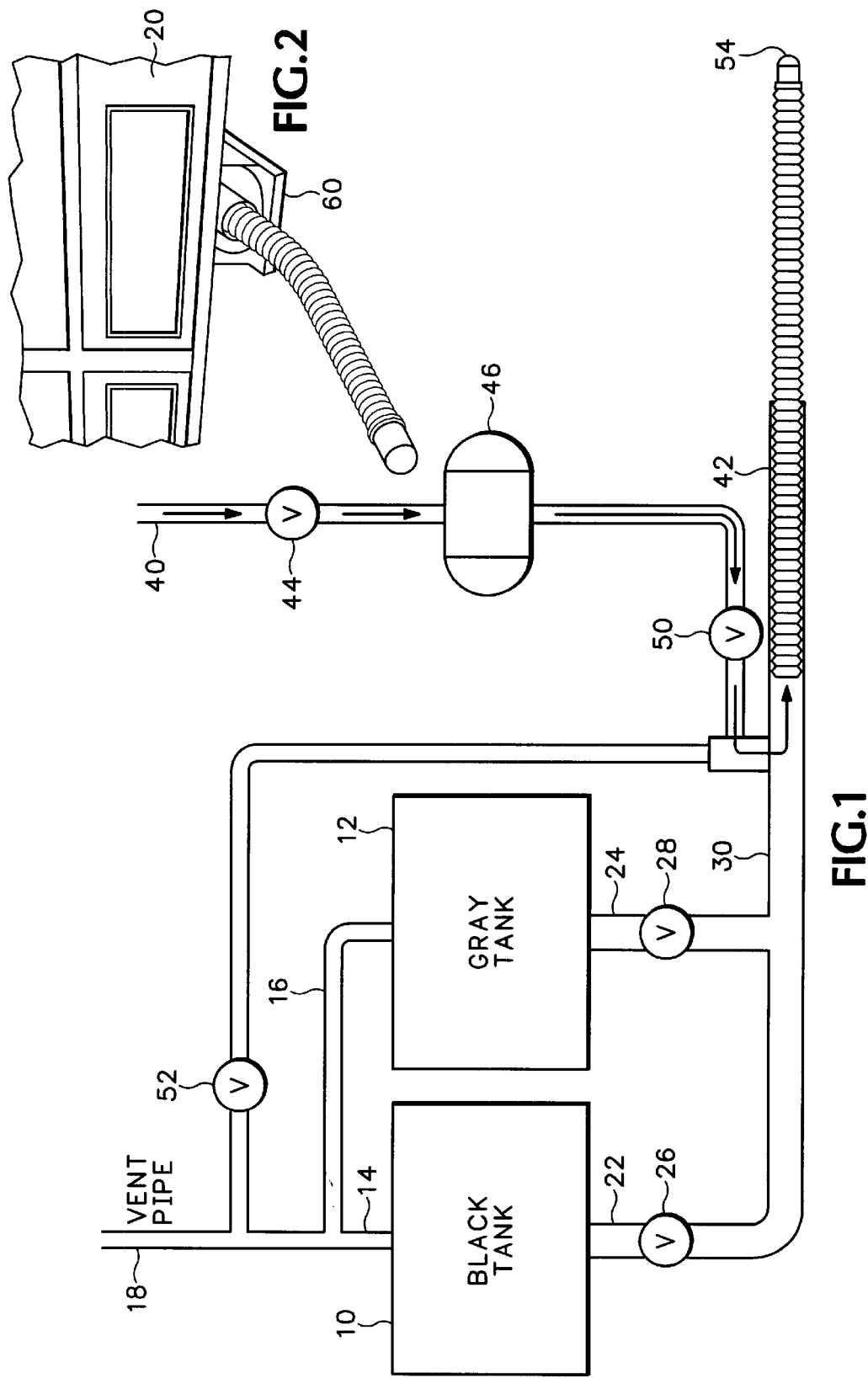

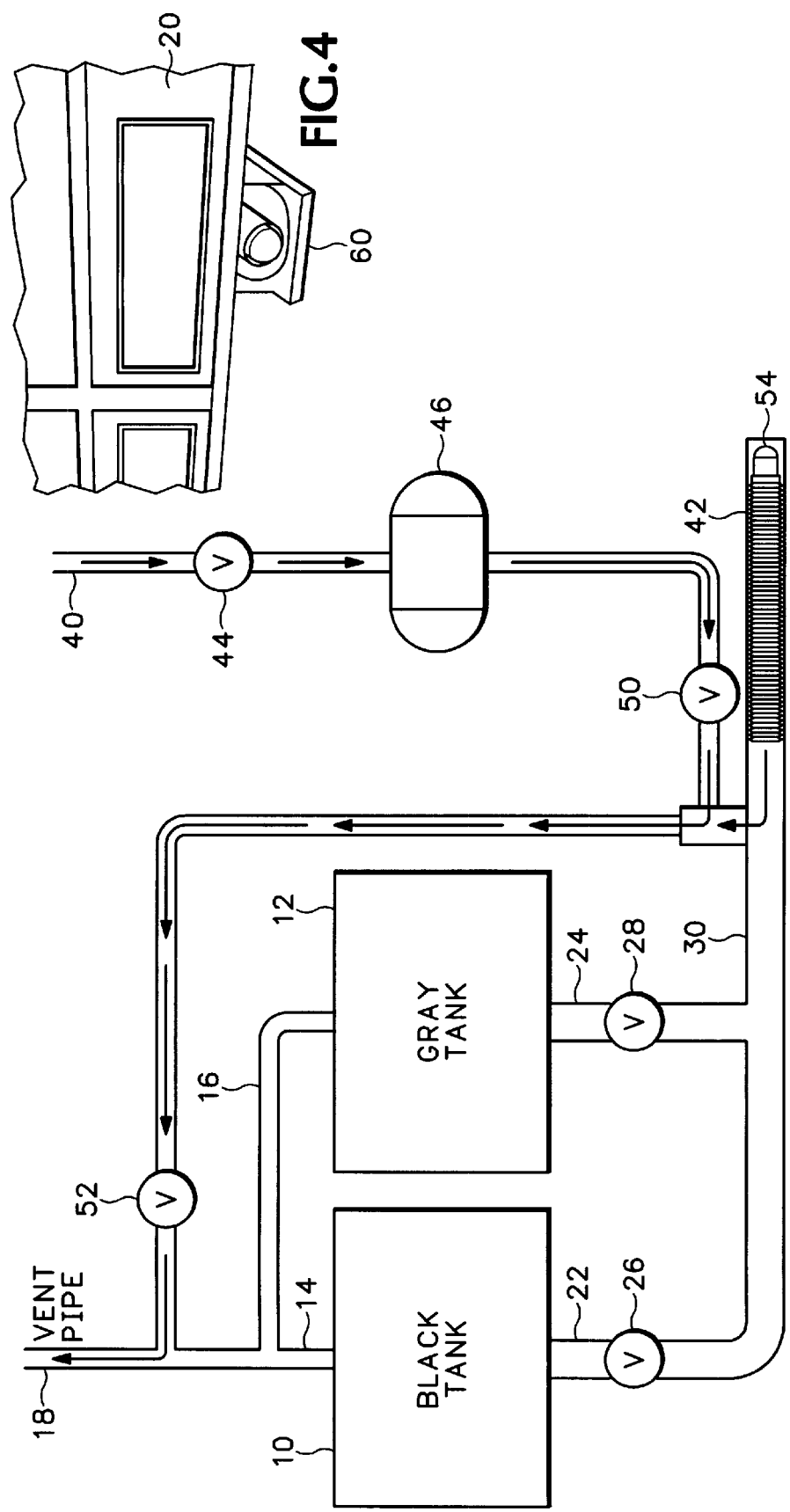

SEWAGE SYSTEM FOR VEHICLES

BACKGROUND OF THE INVENTION

The present invention relates to a sewage system for a vehicle.

Many types of vehicles, such as recreational vehicles, travel trailers, fifth wheelers, buses, trucks, and the like have self-contained fluid systems, sinks, washing facilities and/or bathrooms. Each of these vehicles and others will be collectively referred to herein as "recreational vehicles" or "RVs". Such RVs include systems which store sewage and waste water until those materials can be properly disposed of. Typically, RVs generally utilize similar means of conducting waste to external storage tanks, dumps, or processing systems, such as those which are used in RV parks, truck stops, bus stops, and the like. Conventional RVs generally have two holding tanks, a sewage tanks (e.g., black tank) for receiving fluid sewage from the toilet system, and a grey water tank for receiving waste water, such as from the kitchen, bathroom sinks, and shower. These two holding tanks are interconnected to form a single liquid conduit drain line or drain pipe. RVs generally have an accessible external cabinet or storage facility which stores a length of flexible sewage discharge hose or other conduit. This discharge hose or other conduit may be manually connected to a fitting on the outlet stub of the drain pipe. The other end of the hose or other conduit is then extended to a dump fitting. Similarly, when the RV is preparing to move on, it is also necessary to handle the hose or other conduit, and flush the waste from it before storing it. These processes, i.e., dumping the waste from the holding tank into the inlet receptacle of the RV dump station and disconnecting and storing the hose or other conduit, are the messiest and most dreaded aspects of using an RV.

Besides the mess of dealing with the liquid waste problem, the predominate problem with the traditional sewage hose or other conduit system, is that the RV user must get on his or her knees and reach beneath the RV to attach the sewage hose or other conduit to the outlet pipe of the conduit beneath the RV. Consequently, there have been numerous devices which have been developed to increase the ease and/or reduce the clumsiness of attaching and detaching RV sewage hoses or other conduits. Many of such systems include flexible discharge hoses that are stored in a conduit extension member beneath the RV, and are telescopically moved therefrom when it is desired to secure the hose to a dump site. While these systems have their merits, these devices are stored permanently beneath the RV, and they still generally require the RV user to get on his or her knees to reach beneath the RV to access the sewage hose.

Mercer, U.S. Pat. No. 5,023,959, discloses a system for extending and retracting the waste hose for a waste disposal system that is typically found on recreational vehicles. The disposal system includes a power driven hose extender for extending the collapsible hose from its collapsed mode stored on-board the recreational vehicle to its extended configuration which it is used for dumping waste from an RV holding tank into an inlet of an RV waste dump station. In particular, a hose driver is used to axially displace threaded shafts, wherein an external collar engages around the accordion hose, which has a continuous helical rib.

Mercer, U.S. Pat. No. 4,133,347, discloses a waste evacuation attachment for a recreational vehicle that includes a rigid cylindrical housing readily mountable to the existing fitting of a sewage discharge outlet of the recreational vehicle. A telescoping hose is contained within the housing and has a fitting on the extendable end to adapt the hose to waste receiving receptacles. The extension and retraction of the hose is by extending and retracting the hose within the housing. Foreman, U.S. Pat. No. 4,854,349, likewise discloses telescoping hose contained within a housing.

Hanemaayer, U.S. Pat. No. 5,653,262, discloses an axially extendable flexible hose connected to a waste outlet of a tank. An elongated tubular housing is provided within which the flexible hose extends such that the hose can be stored in the housing and also drawn outwardly of the distal end of the housing toward a waste receptacle. The housing has an articulated connection at a proximate end thereof adjacent the waste outlet. The extension and retraction of the hose is by extending and retracting the articulated hose within the housing.

Cook, U.S. Pat. No. 4,223,702, discloses a telescoping drain line for connecting recreational vehicles to a sewage system. The flexible hose extends through the telescoping pipe sections.

Feliz, U.S. Pat. No. 3,811,462; Boomgaarden, U.S. Pat. No. 5,244,003; Leech, U.S. Pat. No. 5,904,183; and Sargent et al., U.S. Pat. No. 4,779,650, likewise disclose telescoping tubular arrangements.

While many of the aforementioned systems provide telescoping tubular arrangements, they still require a substantial amount of effort on the part of the user to discharge the sewage.

BRIEF DESCRIPTION OF THE DRAWINGS

FIG. 1 is an exemplary schematic of a sewage system for a vehicle for extending a waste hose.

FIG. 2 is a side view of a portion of the vehicle of FIG. 1 showing the waste hose in the extended position.

FIG. 3 is an exemplary schematic of the sewage system for the vehicle of FIG. 1 for retracting the waste hose.

FIG. 4 is a side view of a portion of the vehicle of FIG. 3 showing the waste hose in the retracted position.

DETAILED DESCRIPTION OF THE PREFERRED EMBODIMENT

Referring to FIG. 1, an exemplary waste system for a RV of the present invention may include a black tank 10 for holding toilet sewage and a grey tank 12 for holding other waste water, such as for example, the sink or the shower. The black tank and the grey tank 12 may be replaced by a single storage container, if desired. The black tank 10 and the grey tank 12 are interconnected by pipes 14 and 16 to a vent pipe 18. The vent pipe 18 is preferably vented to the exterior of the recreational vehicle 20 (see FIG. 2) which provides for air flow into and out of the waste system. The black tank 10 may be drained through a drain pipe 22 when a black waste valve 26 is opened. Conversely, when the black waste valve 26 is closed the waste in the black tank 10 is not drained. Similarly, the grey tank 12 may be drained through a drain pipe 24 when a grey waste valve 28 is opened. Conversely, when the grey waste valve 28 is closed the waste in the grey tank 12 is not drained. The waste from the grey tank 12 and black tank 10 are preferably joined into a single drain pipe 30 for eventual discharge from the RV into a suitable receptacle. Multiple drain pipes for discharge of materials from the RV may be used, if desired.

After consideration of the typical recreational vehicle, the present inventors came to the realization that many recreational vehicles include an internal compressor which provides pressurized air (or other gas) that may be used by the waste system. The waste system may use the pressurized air to provide automatic extension and retraction of the waste hose 42. Using an existing pressurized air source reduces the expense of an automated extension and retraction of the waste hose 42. The automatic extension alleviates the need for the user to bend down under the RV or otherwise manually extend and retract the waste hose 42. The waste system preferably includes an intake 40 that provides air pressure from the recreational vehicle 20. The air pressure within the intake may be provided from the recreational vehicle 20 powered when the engine is running or otherwise a compressor within the recreational vehicle 20. An intake check valve 44 is preferably a "one-way" valve that substantially only permits air flow in a single direction, as indicated by the arrows. In this manner, the air flow will not flow back to the pressurized air source. An air tank 46 is preferably included that stores additional compressed air, such as a 7 gallon tank, so that sufficient air pressure is obtained without having to increase the capacity of the air compressor. It is to be understood that valve, as used herein, refers to any mechanism that is suitable to control the flow, stop the flow, restrict the flow or otherwise, of materials through a tubular member.

When the user desires to extend the waste hose 42, a check valve 50 is opened which permits air pressure to flow through the check valve 50 and into the drain pipe 30. A vent check valve 52 is preferably closed to primarily restrict the air flow through the drain pipe 30. Likewise, preferably the black waste valve 26 and the grey waste valve 28 are closed. Accordingly, substantially all the air flow will be acting upon the waste hose 42 which is preferably slidably engaged with the waste system. More preferably the waste hose 42 (or a majority thereof) is freely slidably engaged with the waste system over a majority of its extension. Moreover, the waste hose 42 may rotatably extend or move based upon other mechanisms in such a manner as to extend from the vehicle. The pressure exerted on the end portion of the waste hose 42, capped by a detachably engageable cover 54, will cause the waste hose 42 to slide outwardly from the recreational vehicle 20, as illustrated in FIG. 2. In this manner, by simply opening the valve 50 the waste hose 42 may be slidably extended in a manner that is free from the user having to manually pull or otherwise extend the waste hose. After extending the waste hose 42 the cover 54 is removed and the waste hose 42 is interconnected with the suitable waste receptacle. Other air pressure techniques may likewise be used to extend the waste hose 42, such as for example, air pressure against the interior end 54 of the waste hose 42 as opposed to air pressure against the cover 54, an air pressure operated rotational mechanism that extends/retracts the waste hose 42, and a hydraulics based pressure extension/retraction mechanism. Moreover, if desired the air pressure mechanism may be replaced by an electrical extension/retraction system or other type of extension/retraction system that automatically extends and/or retracts the waste hose 42. Thereafter the black tank and/or the grey tank may be emptied into the receptacle by selectively opening the black waste valve 26 and/or the grey waste valve 28, respectively. The waste hose 42 may be, for example, articulated, non-articulated, extendable lengthwise, non-extendable lengthwise, substantially non-compressible, and/or substantially compressible. Further, the waste hose 42 may be any type of tubular member having any cross sectional profile(s) suitable to pass liquids through.

For example, the waste system may be used to extend the waste hose 42 as follows. Initially a button, a lever, or other user initiation of the waste system is performed. The vent check valve 52 is closed if not already closed, the black waste valve 26 is closed if not already closed, the grey waste valve 28 is closed if not already closed, and the check valve 50 is opened if not already opened. The air from the air intake 40 and/or air from the air tank 46 provides air pressure against the waste hose 42 (or other mechanism) which causes the waste hose 42 to slidably extend outwardly from the vehicle 20. The user then removes the cover 54 and engages the waste hose 42 with the receptacle.

Referring to FIG. 3, the waste system may retract the waste hose 42 as follows. The user disengages the waste hose 42 from the receptacle and replaces the cover 54. The user then presses a button, a lever, or other user initiation of the waste system if performed. The vent check valve 52 is opened if not already opened, the black waste valve 26 is closed if not already closed, the grey waste valve 28 is closed if not already closed, and the check valve 50 is opened if not already opened. The air from the air intake 40 and/or air from the air tank 46 provides air pressure that passes through the vent check valve 52 which creates a vacuum within the waste hose 42 which causes the waste hose 42 to retract inwardly toward the vehicle 20, as illustrated in FIG. 4. After completing usage of the waste system, the vent check valve 52, the check valve 50, the black waste valve 26, and/or the grey waste valve 28 are preferably closed.

After further consideration, the present inventors determined that having a stationary opening under the recreational vehicle 20 for the waste hose 42 permits the waste hose 42 to be inadvertently damaged while traveling. Moreover, having a manually removable cover for the stationary opening, while advantageous, still requires the user to manually remove the cover. Referring to FIGS. 2 and 4, preferably the waste hose 42 is supported by a movable support 60. In a closed position, the support 60 rotates, raises, or otherwise moves such that the waste hose 42 is not free to extend. Also, the support 60 moves the end of the waste hose 42 to a position that is protected from the exterior elements when not in use. Moreover, preferably upon moving the support 60 to an opened position, the end of the hose is directed at an acute angular relationship, such as for example 10–45 degrees, with respect to the ground. This angular relationship assists in directing the waste hose 42 across the ground in a manner that facilitates extension of the waste hose 42.

All references discussed herein are hereby incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A liquid water materials system for a vehicle comprising:

(a) a storage container for liquid waste materials;

(b) an elongate tubular member through which said waste materials may flow, wherein said elongate tubular member has an end;

(c) said end of said elongate tubular member is movable from a first position to a second position, wherein said end when in said second position is further distant from said vehicle than said end in said first position; and (d) wherein said movement of said end is in response to air pressure exerted within said tubular member.

2. The system of claim 1 wherein said storage container includes a first container and a second container.

3. The system of claim 1 wherein said first container stores toilet sewage and said second container stores shower waste water.

4. The system of claim 1 wherein said storage container is vented to the exterior of said vehicle.

5. The system of claim 3 further comprising a first valve interconnected to the output of said first container and a second valve interconnected to the output of said second container.

6. The system of claim 1 further comprising an air tank that provides pressurized air for said movement.

7. The system of claim 6 further comprising first check valve interconnected to the output of said air tank and a second check valve interconnected to the input of said air tank.

8. The system of claim 1 further comprising a valve that selectively causes said movement of said end.

9. The system of claim 1 further comprising said end of said elongate tubular member being movable from said second position to said first position, wherein said end when in said second position is further distant from said vehicle than said end in said first position, wherein said movement of said end is in response to air pressure.

10. The system of claim 1 further comprising said end of said elongate tubular member being movable from said second position to said first position, wherein said end when in said second position is further distant from said vehicle than said end in said first position, wherein said movement of said end is in response to air pressure.

11. A liquid water materials system for a vehicle comprising:
   (a) a storage container for liquid waste materials;
   (b) an elongate tubular member through which said waste materials may flow, wherein said elongate tubular member has an end;
   (c) said end of said elongate tubular member is movable from a first position to a second position, wherein said end when in said second position is further distant from said vehicle than said end in said first position; and
   (d) wherein said movement of said end is slidably engaged with said vehicle free from engagement with external ribs of said tubular member.

12. The system of claim 11 wherein said storage container includes a first container and a second container.

13. The system of claim 12 wherein said first container stores toilet sewage and said second container stores shower waste water.

14. The system of claim 11 wherein said storage container is vented to the exterior of said vehicle.

15. The system of claim 13 further comprising a first valve interconnected to the output of said first container and a second valve interconnected to the output of said second container.

16. The system of claim 11 further comprising an air tank that provides pressurized air for said movement.

17. The system of claim 16 further comprising first check valve interconnected to the output of said air tank and a second check valve interconnected to the input of said air tank.

18. The system of claim 11 further comprising a valve that selectively causes said movement of said end.

19. The system of claim 11 further comprising said end of said elongate tubular member being movable from said second position to said first position, wherein said end when in said second position is further distant from said vehicle than said end in said first position, wherein said movement of said end is slidably engaged with said vehicle.

20. The system of claim 11 wherein said movement is in response to air pressure.

21. A liquid water materials system for a vehicle comprising:
   (a) a storage container for liquid waste materials;
   (b) an elongate tubular member through which said waste materials may flow, wherein said elongate tubular member has an end;
   (c) said end of said elongate tubular member is movable from a first position to a second position, wherein said end when in said second position is further distant from said vehicle than said end in said first position; and
   (d) wherein said movement of a majority of said tubular member is slidably engaged with said vehicle over a majority of the distance between said first position and said second position.

22. The system of claim 21 wherein said slidable engagement is freely slidably engaged.

23. The system of claim 21 wherein said storage container includes a first container and a second container.

24. The system of claim 23 wherein said first container stores toilet sewage and said second container stores shower waste water.

25. The system of claim 21 wherein said storage container is vented to the exterior of said vehicle.

26. The system of claim 21 further comprising a first valve interconnected to the output of said first container and a second valve interconnected to the output of said second container.

27. The system of claim 21 further comprising an air tank that provides pressurized air for said movement.

28. The system of claim 27 further comprising first check valve interconnected to the output of said air tank and a second check valve interconnected to the input of said air tank.

29. The system of claim 21 further comprising a valve that selectively causes said movement of said end.

30. A liquid water materials system for a vehicle comprising:
   (a) a storage container for liquid waste materials;
   (b) an elongate tubular member through which said waste materials may flow, wherein said elongate tubular member has an end;
   (c) said end of said elongate tubular member is movable from a first position to a second position, wherein said end when in said second position is further distant from said vehicle than said end in said first position; and
   (d) wherein said end of said elongate tubular member is maintained in a first elevation prior to movement from said first position to said second position, wherein said end of said tubular member is maintained in a second elevation prior to movement from said first elevation to said second elevation, wherein said first elevation is lower than said second elevation, wherein said end of said tubular member is moved from said second elevation to said first elevation prior to moving from said first position to said second position.

* * * * *